(12) United States Patent
Fletcher et al.

(10) Patent No.: US 7,436,437 B2
(45) Date of Patent: *Oct. 14, 2008

(54) METHOD, DEVICE AND COMPUTER PROGRAM PRODUCT FOR IMAGE STABILIZATION USING COLOR MATCHING

(75) Inventors: Susan Heath Calvin Fletcher, Huntsville, AL (US); Gene Arthur Grindstaff, Decatur, AL (US); Therman Ward McKay, III, Huntsville, AL (US)

(73) Assignee: Intergraph Software Technologies Company, Las Vegas, NV (US)

( * ) Notice: Subject to any disclaimer, the term of this patent is extended or adjusted under 35 U.S.C. 154(b) by 951 days.

This patent is subject to a terminal disclaimer.

(21) Appl. No.: 10/669,818

(22) Filed: Sep. 24, 2003

(65) Prior Publication Data

US 2004/0061786 A1 Apr. 1, 2004

Related U.S. Application Data

(63) Continuation of application No. 10/237,167, filed on Sep. 6, 2002, now Pat. No. 6,654,049.

(60) Provisional application No. 60/318,164, filed on Sep. 7, 2001.

(51) Int. Cl.
*H04N 5/228* (2006.01)
*G06K 9/32* (2006.01)

(52) U.S. Cl. .................... 348/208.6; 382/294

(58) Field of Classification Search ............. 348/208.6, 348/208.99, 208.4, 208.12, 208.13, 169, 348/170, 172, 716; 382/294, 295, 165, 255, 382/275, 293

See application file for complete search history.

(56) References Cited

U.S. PATENT DOCUMENTS 3,952,151 A   4/1976   Jenkin ...................... 178/6.8
4,864,409 A   9/1989   Platte et al. ............. 348/208.6
5,030,984 A   7/1991   Buckler et al. ............ 354/430
5,053,876 A   10/1991  Blissett et al. ............ 358/222

(Continued)

FOREIGN PATENT DOCUMENTS

EP   0613020    8/1994
FR   2794880    12/2000

OTHER PUBLICATIONS

Guestrin, C., et al. "Fast Software Image Stabilization with Color Registration," Intelligent Robots and Systems, IEEE/RSJ International Conference on Victoria, BC, Canada, Oct. 13, 1998, pp. 19-24.
International Search Report, dated Nov. 13, 2002, received Nov. 21, 2002.

*Primary Examiner*—John M Villecco
(74) *Attorney, Agent, or Firm*—Bromberg & Sunstein LLP (57) ABSTRACT

A method for image stabilization of at least two digital images is disclosed. In such an embodiment, a first digital image having a plurality of pixels and at least a second image having a plurality of pixels are provided. Each pixel has an associated address for display and is representative of a color. Either a user of the system provides a color match range or the system provides a predetermined color matched range. A pixel is selected within the first digital image. Preferably the pixel is one that represents an item within the image that is either blurry due to movement of the item or appears jittery due to camera movement. Due to the vast number of available colors a pixel selected in a first image can be matched to a pixel in a second image within a range. The range allows for compensation due to lighting changes. Once the pixel in the first image is selected it can be compared to all pixels within the second image. Each pixel within the second image that is within the color match range is saved and the closest pixel color to the pixel from the first image is selected. The address of the pixels in the second image are then readdressed such that the address of the pixel located in the second image that has the closest color to the pixel in the first image now has the same display address as that of the pixel in the first image. The repositioned second digital image is then stored to memory.

58 Claims, 8 Drawing Sheets

U.S. PATENT DOCUMENTS

| | | | |
|---|---|---|---|
| 5,099,323 A | 3/1992 | Morimura et al. | 348/207.99 |
| 5,253,052 A | 10/1993 | Hanashiro et al. | 375/250.12 |
| 5,629,988 A | 5/1997 | Burt et al. | 382/276 |
| 5,786,824 A | 7/1998 | Sevigny | 345/438 |
| 5,796,427 A | 8/1998 | Suzuki | 348/208.6 |
| 5,892,546 A | 4/1999 | Hirabayashi et al. | 348/394 |
| 5,920,657 A * | 7/1999 | Bender et al. | 382/284 |
| 5,973,733 A | 10/1999 | Gove | 348/208.13 |
| 6,122,004 A | 9/2000 | Hwang | 348/208.13 |
| 6,128,108 A * | 10/2000 | Teo | 382/284 |
| 6,144,405 A | 11/2000 | Toba | 348/208.4 |
| 6,211,913 B1 | 4/2001 | Hansen et al. | 348/239 |
| 6,493,041 B1 | 12/2002 | Hanko et al. | 348/699 |
| 6,560,375 B1 * | 5/2003 | Hathaway et al. | 382/295 |
| 2002/0006219 A1 | 1/2002 | Hudson | 382/153 |
| 2002/0168091 A1 | 11/2002 | Trajkovic | 382/107 |
| 2003/0083850 A1 * | 5/2003 | Schmidt et al. | 702/189 |
| 2005/0088534 A1 * | 4/2005 | Shen et al. | 348/218.1 |
| 2005/0271272 A1 * | 12/2005 | Shinkevich | 382/254 |
| 2006/0061661 A1 * | 3/2006 | Grindstaff et al. | 348/208.99 |
| 2006/0140507 A1 * | 6/2006 | Ohki | 348/208.99 |

* cited by examiner

METHOD, DEVICE AND COMPUTER PROGRAM PRODUCT FOR IMAGE STABILIZATION USING COLOR MATCHING

PRIORITY

This application claims priority from U.S. Provisional Application No. 60/318,164, filed Sep. 7, 2001 entitled "Method, Device and Computer Program Product for Analysis of Video Images", the full disclosure of which is hereby incorporated by reference herein in its entirety and the present application also claims priority from U.S. patent application Ser. No. 10/237,167 entitled "Method, Device and Computer Program for Image Stabilization Using Color Matching" filed on Sep. 6, 2002 which is incorporated by reference herein in its entirety.

TECHNICAL FIELD

The present invention relates to analysis of video images and more specifically to image stabilization of video images.

BACKGROUND

Video stabilization is known within the prior art to minimize image jitter due to camera movement through either mechanical feedback systems or through digital signal processing. The digital signal processing techniques of the prior art are complicated and often are based upon motion estimation and vector analysis. These techniques are designed so as to be minimally intrusive to movement within the image and assess movement of blocks of pixels in order to isolate camera movement jitter.

When objects move within captured video images as opposed to the camera moving details of the moving object being captured often are hard to discern. For example, a license plate of a moving car is often hard to read when the captured video images are displayed due to the great amount of motion from frame to frame of the car. In such a situation, an accounting for the motion of the car would enhance the ability to read the license plate.

The traditional image stabilization techniques as discussed above do not provide a way to account for motion such as the motion of a car in order to make a license plate more legible because the techniques are designed to allow such motion to be visible within the sequence of video images while only removing movement due to the movement of the camera.

SUMMARY OF THE INVENTION

In one embodiment of the invention, a method for image stabilization of at least two digital images is disclosed. In such an embodiment, a first digital image having a plurality of pixels and at least a second image having a plurality of pixels are provided. Each pixel has an associated address for display and is representative of a color. Either a user of the system provides a color match range or the system provides a predetermined color matched range. A pixel is selected within the first digital image. Preferably the pixel is one that represents an item within the image that is either blurry due to movement of the item or appears jittery due to camera movement. Due to the vast number of available colors a pixel selected in a first image can be matched to a pixel in a second image within a range. The range allows for compensation due to lighting changes. Once the pixel in the first image is selected it can be compared to all pixels within the second image. Each pixel within the second image that is within the color match range is saved and the closest pixel color to the pixel from the first image is selected. The address of the pixels in the second image are then readdressed such that the address of the pixel located in the second image that has the closest color to the pixel in the first image now has the same display address as that of the pixel in the first image. The repositioned second digital image is then stored to memory.

In other embodiments the image area that is to be searched within the second image may be selected by a user of the method. In another embodiment an alignment point can be selected for aligning the first digital image and the repositioned second digital image such that the pixel of the first frame is aligned with the alignment point and the pixel in the second digital image is aligned with the alignment point when displayed on a display device.

Once the second digital image is saved the first digital image and the repositioned second digital image may be displayed sequentially on a display device wherein the movement of the item will be minimized.

In a further embodiment, interpolation may be employed to determine color values for comparison in a sequence of video images. In the sequence, a beginning digital image and an ending digital image from the sequence creating a subset sequence are selected. A pixel is the selected in the beginning digital image and a pixel is selected in the ending digital image. Linear interpolation is performed between the color of the pixel in the beginning digital image and the color of the pixel in the ending digital image such that an interpolated color is determined for each image between the beginning digital image and the ending digital image. For each interpolated color associated with an image, a pixel is searched for within that image within a predetermined range of colors. Once a pixel is found, each image is repositioned so that the address of the pixel having the interpolated color is positioned to the address of the pixel selected in the beginning image.

In certain embodiments, the color match range may be equal to zero, such that an exact match needs to be found. The greater the number of representative colors, such as true color or 16.7 million colors, the greater the likelihood that a match of one pixel in a first frame represents the same physical location as that of a pixel in a second frame having the same or a very similar color. If a color is not found in an image that is within a color match range, the method can default to a standardized formula for repositioning the image based upon historic information.

The method may also be implemented in a computer system and embodied on a computer program product for use with the computer system in which the method is embodied in computer readable code. Further, the method may be embodied in a system which includes a user interface, a processor, and associated memory. The processor includes a user interface module for receiving signals from the user interface. In such a configuration, a user may send signals to the processor through the user interface indicating the video sequence to be processed, indicating a color match range, selecting pixel values, selecting alignment positions, for example. The processor also includes a location module for locating a pixel within a second frame having an associated color that is within a color range of a color associated with the pixel selection from the first video frame. The processor further includes a repositioning module for readdressing the second video frame so that the located pixel of the second frame has an address that is the same address as the pixel selection form the first video frame and also includes a storage module for storing the readdressed second video frame.

BRIEF DESCRIPTION OF THE DRAWINGS

The features of the invention will be more readily understood by reference to the following detailed description, taken with reference to the accompanying drawings, in which:

FIGS. 3A-C show pixels being repositioned on a screen;

DETAILED DESCRIPTION OF SPECIFIC EMBODIMENTS

Figure 1:
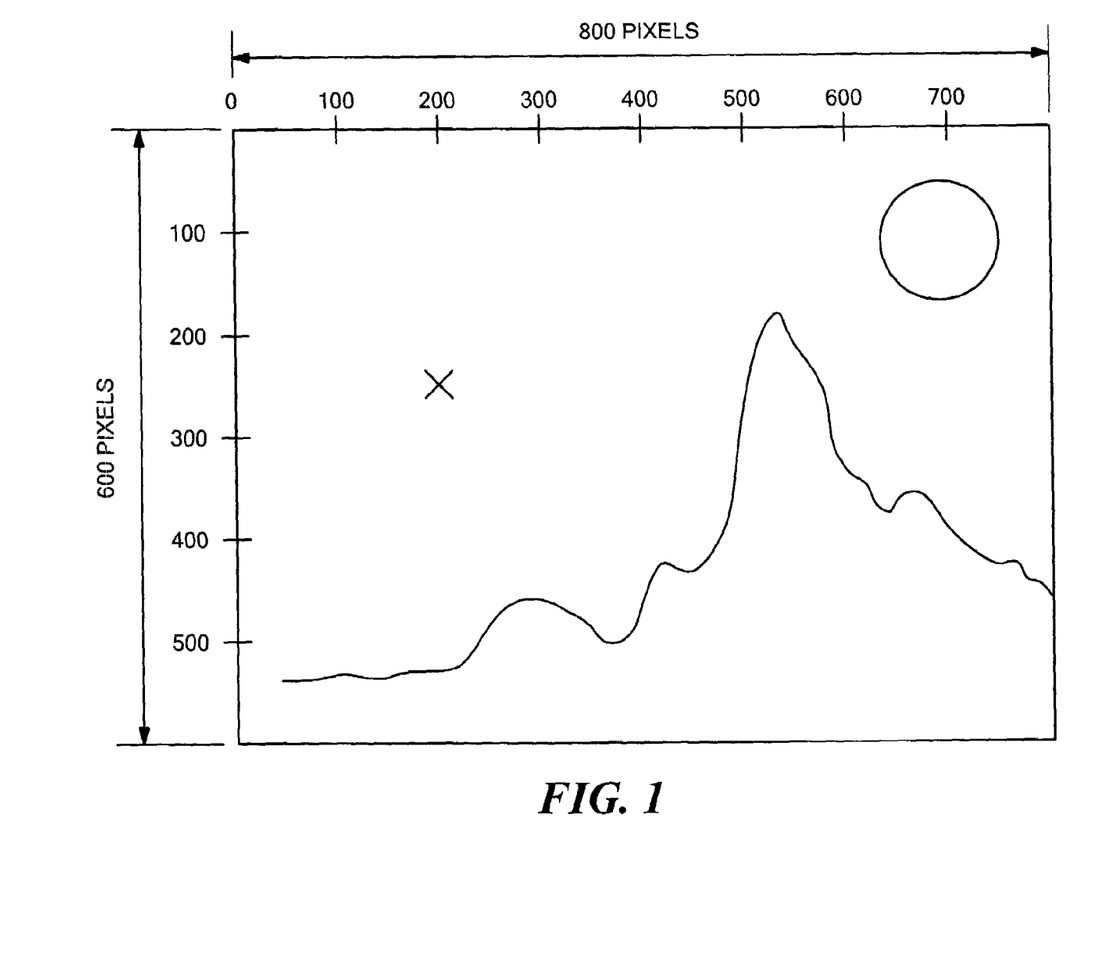
FIG. 1 is an image having a resolution of 800×600 pixels.

As used in the following text, the term "video sequence" implies a digital representation of a sequence of images which may be temporally displayed on a display device. Typically, a video sequence contains a plurality of frames wherein each frame represents a separate image. The frames may be further subdivided such that the frames are made up of a series of pixels. As used in the following description the term "pixel" shall mean a single point of an image. The greater the number of pixels that are contained in an image, the greater the resolution of the video. Resolution of an image/frame is conventionally referenced by length and width measurements of the number of pixels, for example, in a resolution of 800×600, there are 800 pixels along the length of an image by 600 pixels along the width of the image. Associated with each pixel is an address. For example as shown in FIG. 1. an image having a resolution of 800×600 is presented and pixel at address (200,300) is marked with an X wherein the origin is located at the upper left hand corner of the screen. As used herein a frame may be either a complete image or a portion of an image, such as a field which includes only one half of a complete image.

In an embodiment of the invention, a method is presented for stabilizing video images of a digital video sequence wherein the digital video sequence includes a plurality of digital images/frames. Stabilization is performed through color matching of a selected pixel color in a first frame by searching for a pixel in a second frame that has a color which falls within a color tolerance. The second frame is then aligned with the first frame such that the pixel in the second frame with the matching color has the same pixel address as that of the selected pixel from the first frame. The second frame is then stored to memory. This methodology is especially useful as the resolution and number of possible colors which can be represented increases. As video moves to HDTV formats which have 16.7 million and greater possible colors for a pixel color value, pixel color values become more unique and thus color tracking is more effective means for matching images and providing stabilization of images and accounting for motion within images.

Figure 2:
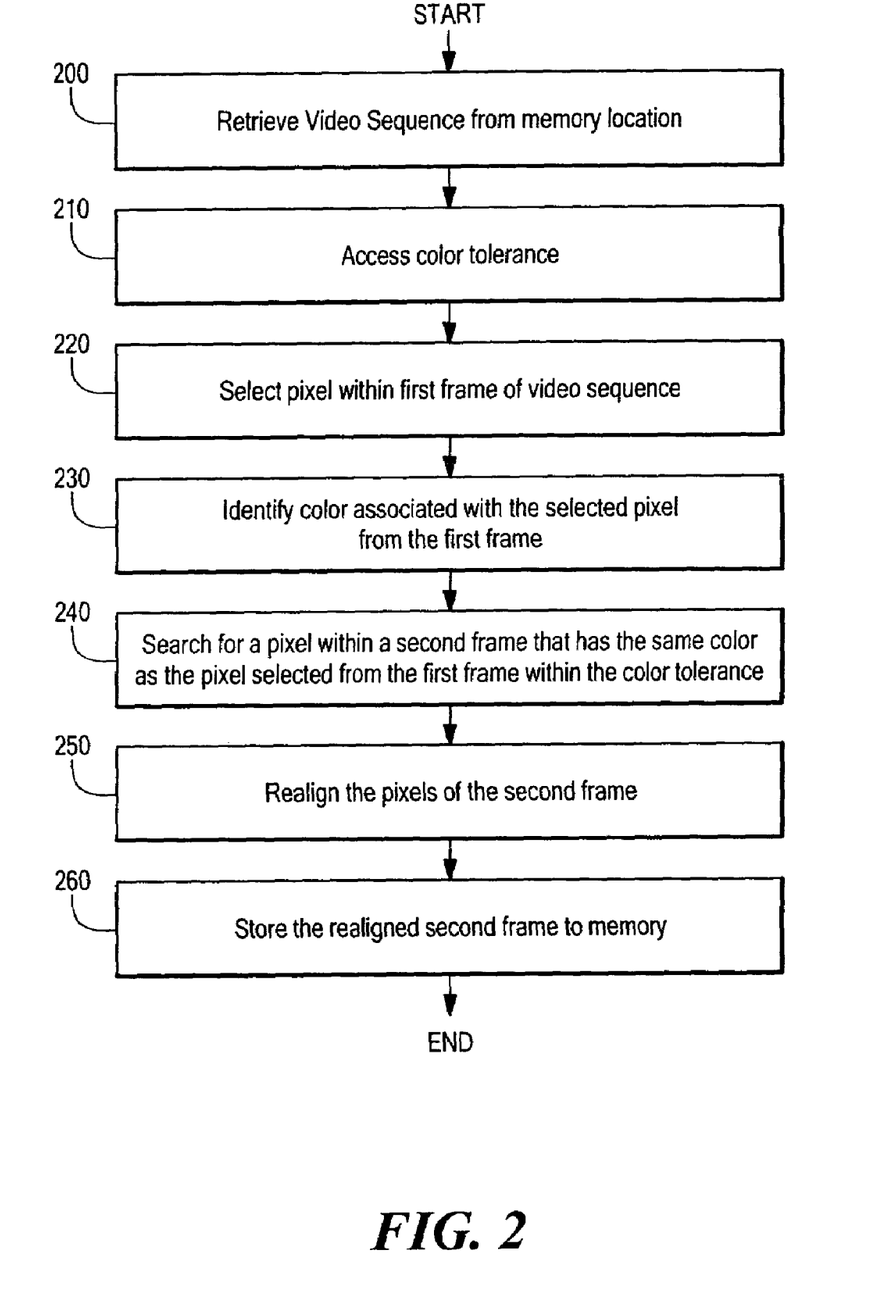
FIG. 2 is a flow chart showing one method for image stabilization through color matching performed in conjunction with a computer system.
Figure 3A:
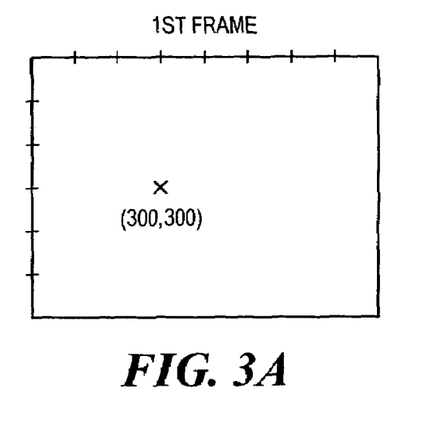
FIG. 3A shows a first frame with a selected pixel.
Figure 3B:
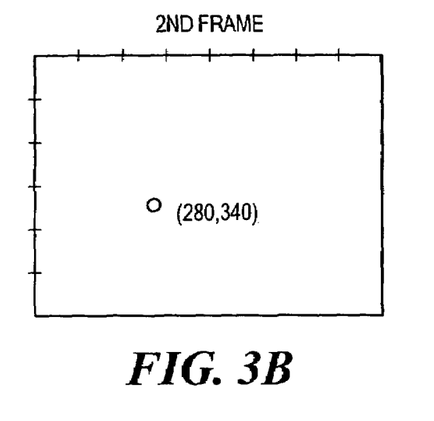
FIG. 3B shows a second frame with a pixel marked having a color within a color tolerance of the pixel selected in FIG. 3A.
Figure 3C:
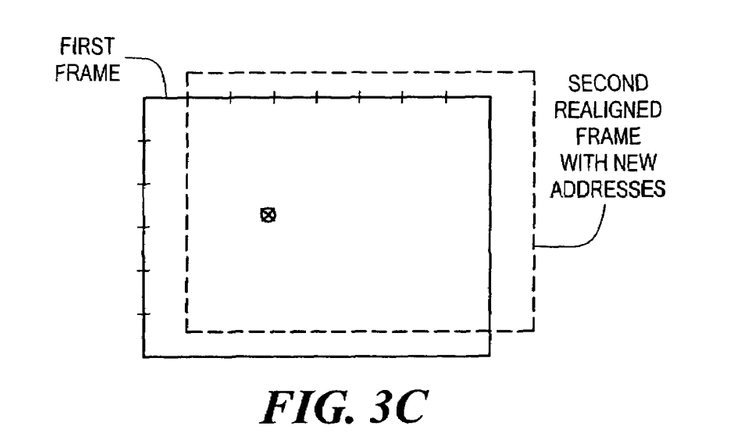
FIG. 3C shows the second frame of FIG. 3B superimposed and realigned on the first frame of FIG. 3A.

The method for image stabilization through color matching is performed in conjunction with a computer system wherein the computer system includes at least a display, an input device, associated memory and a processor. The method is explained in more formal detail with reference to FIG. 2. First a digital sequence is retrieved by the processor of the computer system from a memory location 200. A color tolerance is either predetermined and accessed by the processor or the user is queried for entry of a color tolerance 210. The color tolerance is the range within which a color match will be deemed to occur. A first frame of the video sequence is then displayed to a user. The user then selects a pixel within the first frame 220. Preferably the pixel is of a distinct color or the pixel is part of an object which moves within the video sequence and appears jittery when the video sequence is displayed. After the pixel is selected, the processor identifies the color associated with the pixel 230. The processor then retrieves the second frame and performs a search of the second frame to identify a pixel that has the same color as that of the selected pixel from the first frame within the color tolerance 240. Color matching may be performed by taking the overall color for a pixel including all color components or weighting the individual color components. For example, if the video sequence is represented in an R,G,B, color space, an identical color match (i.e. one having a color tolerance of 0%) might require that each of the R,G, and B values are identical. The color tolerance may be the overall difference in color as a percentage. For example, a color tolerance may be 0.005% wherein the color space includes 16.7 million colors or a color tolerance may require that each color component must be within a certain tolerance of say 10% of each R,G, and B value of the selected pixel. Once a pixel within the second frame is identified, the pixel address from the second frame is then aligned with the pixel address of the selected pixel of the first frame 250. FIGS. 3A, B and C show the pixels being repositioned. FIG. 3A shows a first frame with a selected pixel marked with an X as would be displayed in the display device. FIG. 3B is a second frame wherein a pixel that matches the selected pixel from the first frame is identified with an O. FIG. 3C shows that the displayed pixels of the second frame is repositioned, and thus readdressed. After the second frame is repositioned and thus the addresses of all of the pixels of the frame are changed, the realigned second frame is stored to memory by the processor 260. This process can be continued for each frame of a video sequence. In such an embodiment, the color of the selected pixel from the first frame would be searched for in each subsequent frame. It should be noted that some pixel values of the realigned second frame will not be shown on the display device because the new addresses of these pixels falls outside of the display addresses. Further, some display addresses for the second realigned frame will not have color values for the pixels. In one embodiment, these pixel addresses are made black. In other embodiments, default color values can be assigned such as the color values from adjacent pixel addresses.

Figure 4:
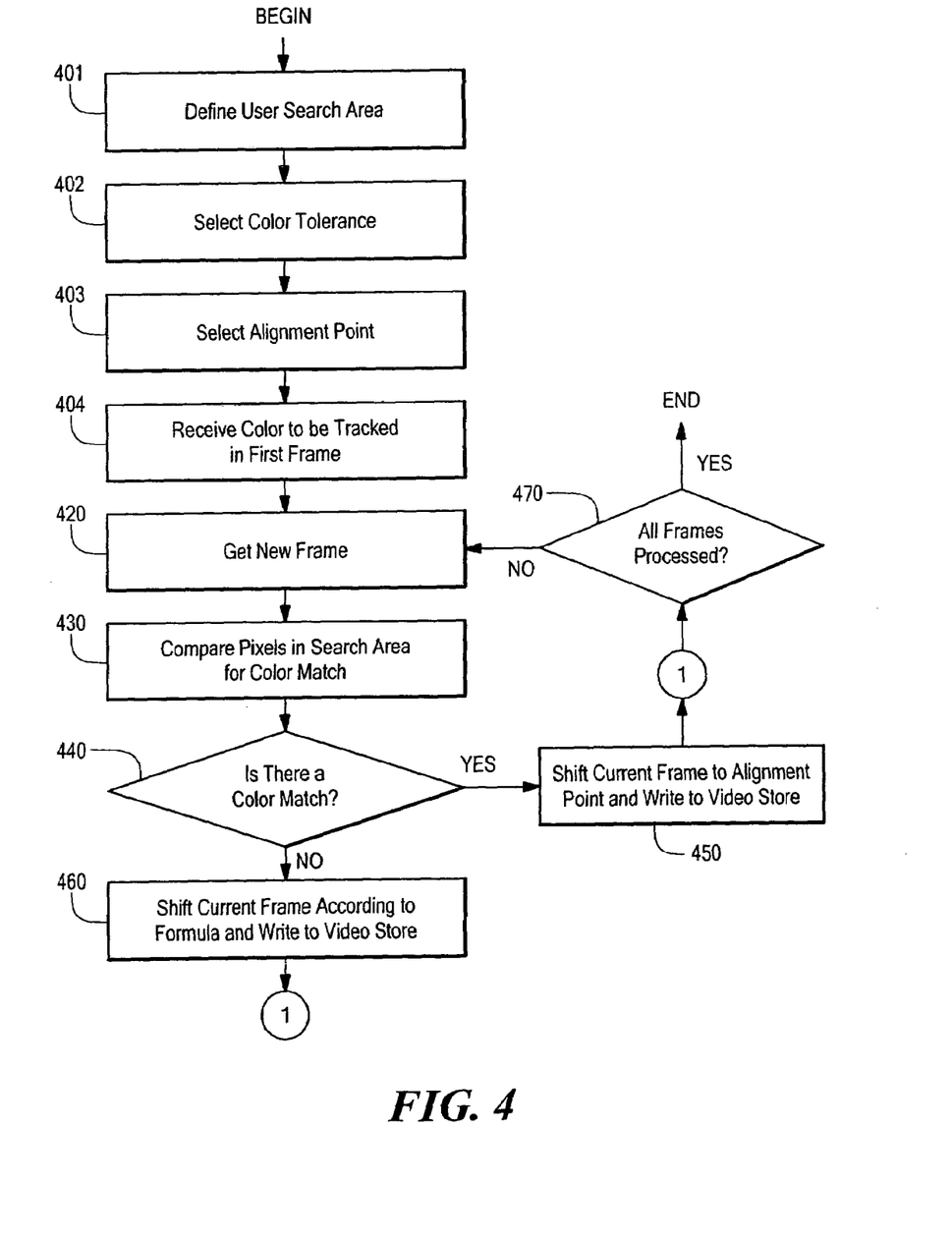
FIG. 4 is a flow chart showing another embodiment for image stabilization.

The methodology may be further defined as shown in FIG. 4. As expressed above, a video sequence is received by a processor from a memory location. A first frame is presented to a user. The user defines a search area within a video frame step 401. For example, the user may use an input device such as a mouse or a light pen to graphically indicate the search area. In one embodiment, the entire video frame is the default search area. Defining a search area that is less than the entire image may be beneficial in images in which a user is interested in a particular element of an image. For example, if the video sequence is of a car that is driving away and the user is interested in the license plate of the car, the user may select a sub-section of the video frame. In the example, the user would indicate that the license plate or a portion of the car was the selected sub-set of the image. The image displayed after re-alignment of the frames could be the entire video frame or just the selected sub-set of the frame.

In a video sequence in which the moving object that is desired to be made still moves across the entire frame, selection of a sub-section of the image, such as that of a license plate, should be done over a short sequence of frames. For example, if the entire sequence is of 120 fields of video (approx. 2 sec.), the sequence may be subdivided such that only a few frames (for example 10 fields) are used. The car and the license plate can then be designated as the sub-section of the image for comparison purposes since the license plate of the car will not move many pixel locations over 10 fields. By selecting a sub-section, this improves the odds that the color matched pixels actually represent the same physical point.

The user is also prompted by the computer system for a color tolerance which as explained above is the acceptable margin of error for matching a color 402. The user can also indicate an alignment point which is the point on the output screen of the display device at which to align the pixel whose color best matches the tracking color 403. In one embodiment, the default is the center of the screen of the display device although other positions on the display may also be selected. The user also provides the color to be tracked 404. This is done by observing the first video frame and selecting a pixel using the user input device.

For each video frame 420, the color values for each pixel of the search area are compared 430 with the color values of the selected tracking color from the first video frame. If the color values for the color space (e.g. R,G,B) of a pixel are within the entered tolerance 440, the pixel will be considered a match. The pixel in which the sum of the absolute values of the differences between the red, green and blue color values to those of the tracking color is smallest is identified as the color match point. If the color match point is within the entered tolerance for each of the color space values associated with the selected pixel, the frame is shifted 450 so that the pixel identified as the best color match is placed at the alignment point on the screen and the shifted frame is then written out to memory. If no color match is found, the image is shifted 460 according to a predetermined formula. For instance, the shifts may be determined by analyzing past shifts and averaging the shifts to determine how to align the frame of video data. For example, the image may be shifted in the x direction by a weighted average of previously shifted distances in the x-direction. Similarly, the shift in the y direction may be a weighted average of previously shifted distances in the y-direction.

In other embodiments, the image may be shifted according to the following formulae:

$$xdiff=((sx1-sx2)+(sx2-sx3)+(sx3-sx4))/3*(sd); \text{ and}$$

$$ydiff=((sy1-sy2)+(sy2-sy3)+(sy3-sy4))/3*(sd); \text{ where}$$

sx1=previous horizontal shift; sy1=previous vertical shift;
sx2=horizontal shift before sx1; sy2=vertical shift before sy1;
sx3=horizontal shift before sx2; sy3=vertical shift before sy2;
sx4=horizontal shift before sx3; sy4=vertical shift before sy3; and where sd is a slowdown factor.

The frame is then shifted 460 by an amount given by the following equations:

horizontal shift=sx1+xdiff; and vertical shift=sy1+ydiff.

The shifted frame is then written out 465 to the video image store.

If the input stream contains 470 more video frames, the next frame is processed 420. Once all of the frames in the input stream are processed, the color tracking operation is complete.

Once all of the frames of video are repositioned using the color tracking, the sequence of frames may be temporally displayed on a display device and thus movement of the camera or object will be reduced. Other than display of the video frames in a temporal fashion, the video frames may be linearly averaged in order to provide a higher definition image or portion of an image For example, a license plate on a vehicle that is moving and which is unreadable due to jitter may be readable once the image is stabilized. Even if it is not, all of the frames may be linearly averaged together to produce a higher resolution image that may provide an enhanced image wherein the license plate is legible. By precisely aligning the images to a sub-pixel resolution, and averaging the images together, a higher resolution image can be generated. This is due to the fact that as several images of an object are captured, each image presents a slightly different part of the object in each frame. In general a minimum of three to five frames are needed to improve the image.

Figure 5:
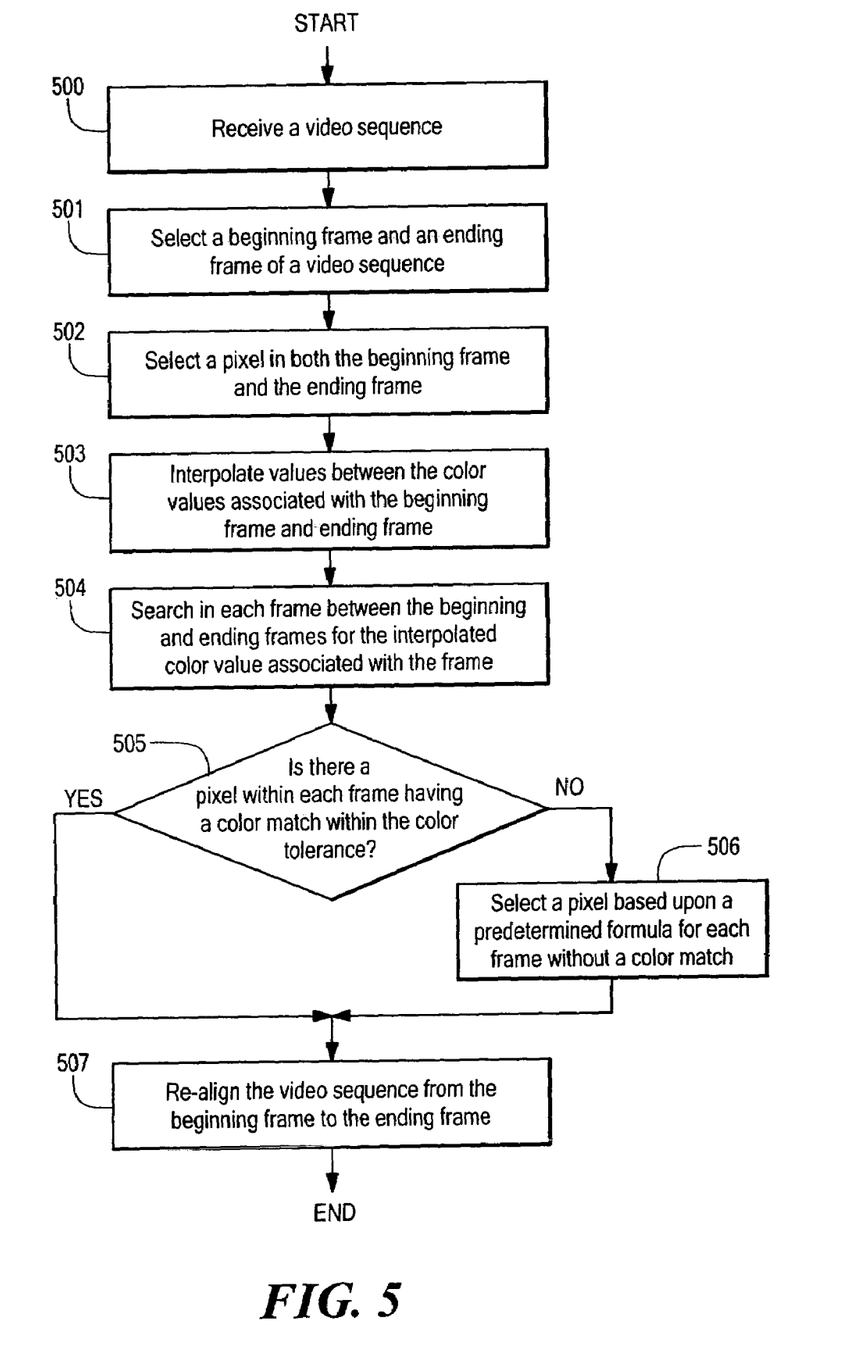
FIG. 5 is a flow chart showing another embodiment of image stabilization using color matching and interpolation.
Figure 6:
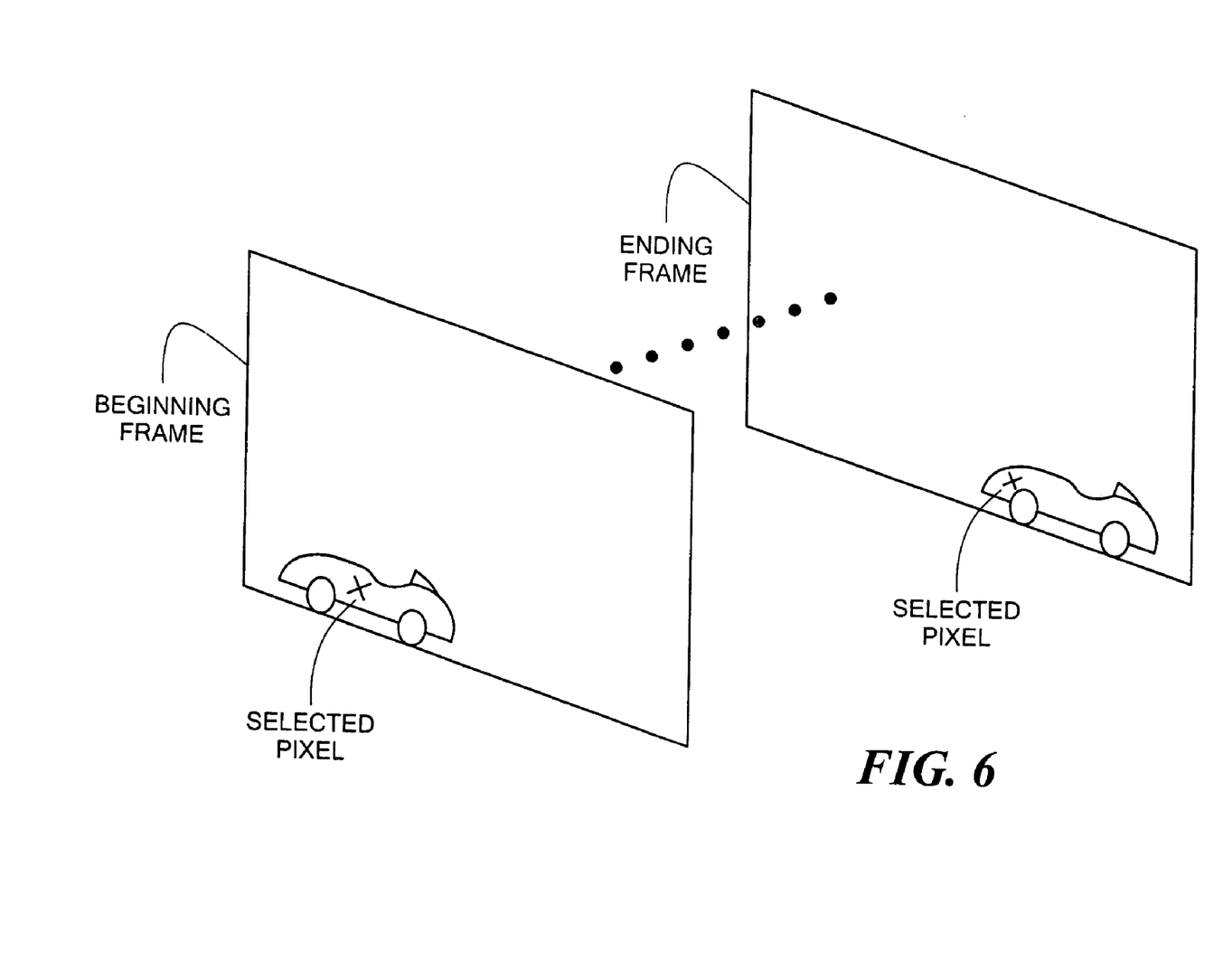
FIG. 6 shows pixel selection in a beginning and ending frame of a video sequence.
Figure 7A:
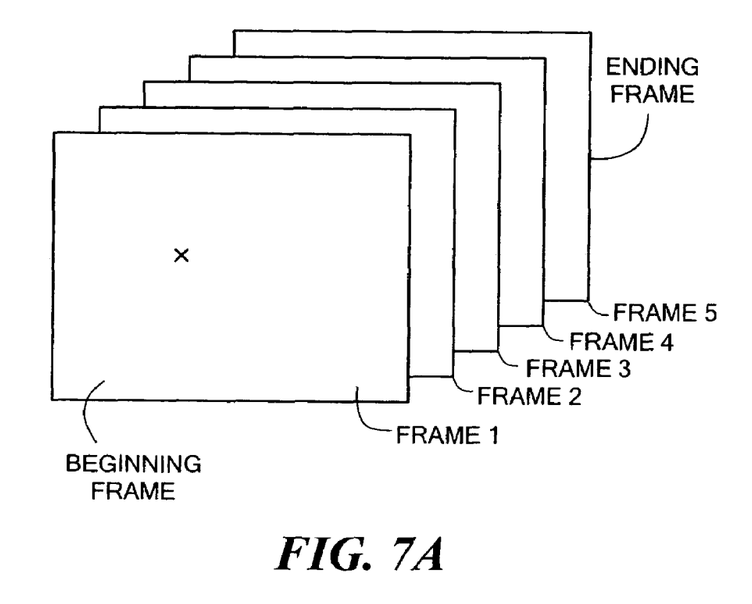
FIG. 7A shows a video sequence prior to image stabilization in which all of the images are aligned.
Figure 7B:
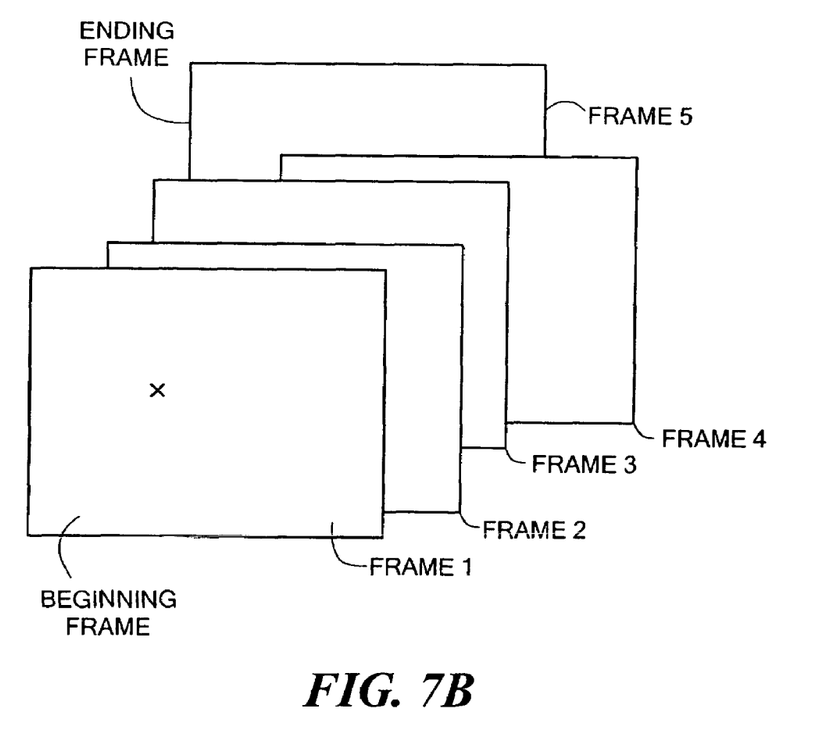
FIG. 7B shows the video sequence of FIG. 7A after realignment.

In another embodiment of the invention, interpolation is employed in conjunction with color matching as is explained in FIG. 5. In such an embodiment, a video sequence is provided into a computer system 500. A user of the system is allowed to view the video sequence on a display device and select a beginning frame and an ending frame 501. A pixel is selected in both the beginning frame and the ending frame 502. Preferably the pixel in the beginning frame and the ending frame is a pixel is part of an object for which motion stabilization is desired. For instance, a pixel may be selected from a video image of a car that is moving. A pixel in the ending frame should be selected that is part of the car as shown in FIG. 6. The system then interpolates between the color value for the selected pixel in the beginning frame and the color value of the pixel in the ending frame 503. The interpolation method may be any interpolation method known by one of ordinary skill in the art, such as linear, bi-linear, and bi-cubic interpolation. The interpolation method provides interpolation values for each frame between the beginning frame and the ending frame. For example, if there are four frames, an interpolated color value would be determined for the second and third frames. Once a color value is determined for each frame between the beginning and ending frames, the processor begins to search for that color value in each respective frame 504. The processor may use a color match range/color tolerance to locate a pixel that matches the color. In one embodiment the processor searches for the first pixel that has the exact color and does not use a color tolerance. In another embodiment, each pixel that is within the color tolerance is saved to memory and a difference measurement as described above is determined until the pixel with the closest color match is determined 505. If no pixels match, the processor employs a formula such as that provided above, or another formula that is based upon trend analysis or another property of the video sequence 506. When a pixel has been selected for each frame, the frames after the beginning frame including the ending frame are re-aligned 507. Realignment requires that the associated addresses of each pixel are re-determined, such that when the video sequence is displayed on a display device the pixel location of the pixel selected in the first frame corresponds with the pixels in the subsequent frames that match the color value. For example, as shown in FIG. 7A a pixel is selected in the beginning frame wherein the remaining frames are aligned as they would normally be displayed. FIG. 7B shows the video frames realigned such that the color matched pixels from all frames subsequent to the beginning frame are positioned at the same point on a display screen as the selected pixel from the beginning frame. This process can be repeated if less than the entire video sequence is included between the beginning frame and the ending frame.

Figure 8:
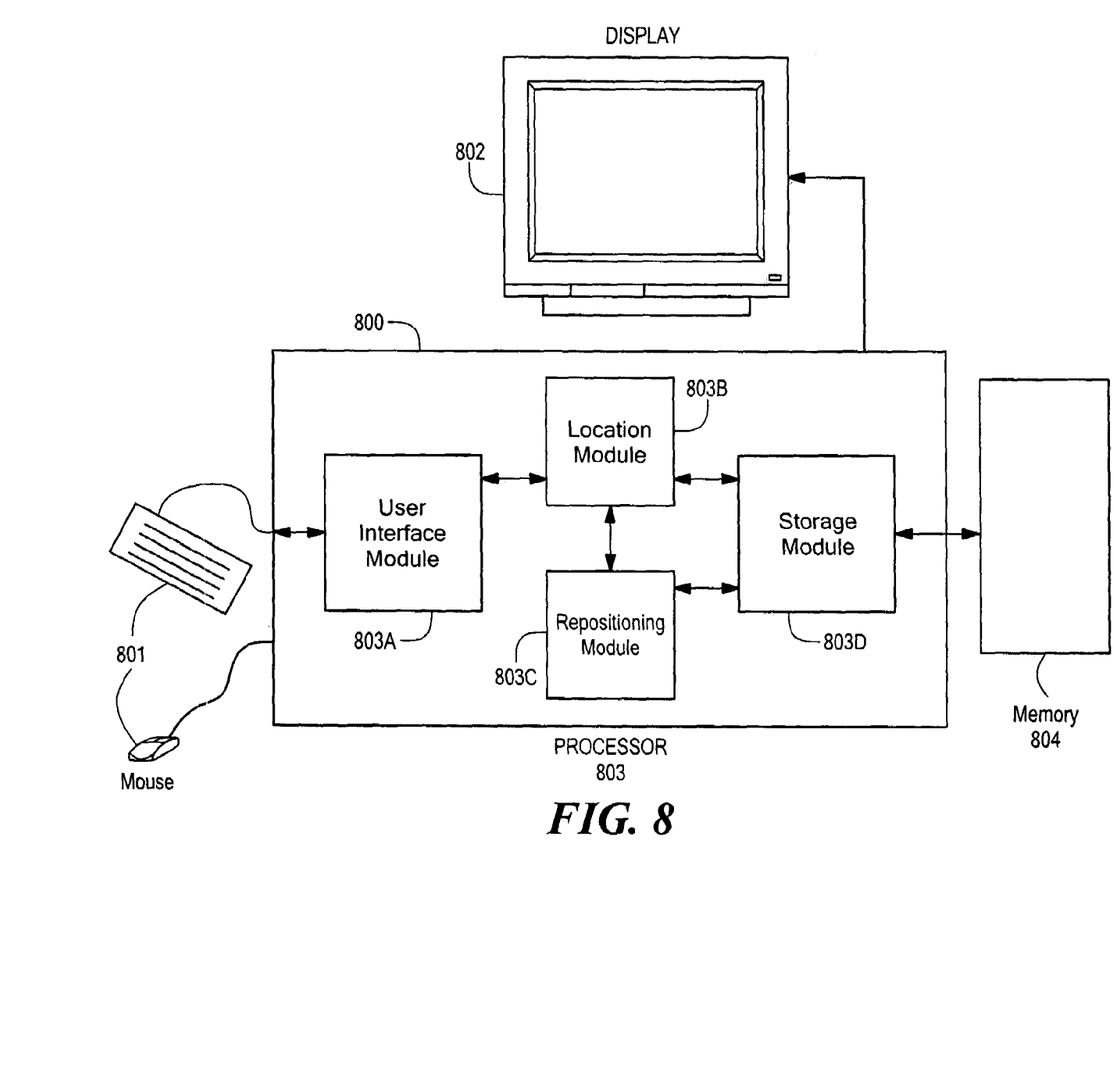
FIG. 8 shows one embodiment of the invention as a system.

The method for image stabilization may be embodied as a system as shown in FIG. 8. The system 800 includes an input device 801 such as a mouse, trackball, keyboard, etc. and video display 802 and a processor 803 having associated memory 804. The processor includes various modules. The first module is a user interface module 803A that operates to receive signals from the user input device. The user can input a request to perform image stabilization on a selected video image sequence. The user can view the first frame of the video sequence and select a pixel within the sequence wherein the user interface module 803A receive this information and sends the information to a location module 803B that identifies the color of the selected pixel and accesses a second frame of the video data. The location module 803B searches the data values of the second frame in order to identify the pixel that is the closest color match to the pixel selected in the first frame. If no pixel is found that is within the color range, then the location module 803B defaults to a predetermined formula such as that which was described above. When a pixel has been identified, the location of the pixel is presented to a repositioning module 803C that re-addresses all of the pixels within the second frame such that the located pixel in the second frame has a new address that is the same display address as the pixel selected in the first frame. The address information along with the corresponding pixel color values are stored to memory by a storage module 803D.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code-form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

We claim:

1. A method of processing a motion picture having first and second frames, each frame having a plurality of pixels, the method comprising:
   selecting a first pixel in the first frame having a given color;
   locating a second pixel in the second frame having the given color;
   aligning the first frame and the second frame based upon the locations of the first and second pixels.

2. The method as defined by claim 1 wherein the first and second frames are aligned in memory.

3. The method as defined by claim 1 wherein aligning comprises aligning the first frame and second frame about the first and second pixels.

4. The method as defined by claim 1 further comprising determining the color of the first pixel, wherein the color is determined to be the given color.

5. The method as defined by claim 1 wherein locating composes determining if the color of the second pixel is within a given color tolerance.

6. The method as defined by claim 1 wherein the first pixel has a first address, further wherein aligning includes rearranging the second pixel to have an address that equals the first address.

7. The method as defined by claim 1 wherein the first frame and the second frame are linearly averaged to provide a third frame.

8. The method as defined by claim 7, wherein the third frame has a higher resolution than the first or second frame.

9. The method as defined by claim 7, wherein the third frame is displayed on a display device.

10. The method according to claim 7 wherein the first and second frames are aligned to a sub-pixel level.

11. The method according to claim 1 further comprising:
selecting a region of the second frame for locating a second pixel having the given color within that region.

12. The method according to claim 11, further comprising:
if a second pixel is not found within the second frame having the given color, aligning the first frame and the second frame based upon a predetermined formula.

13. The method according to claim 12 wherein the predetermined formula is based upon past alignments of frames.

14. A method of processing a motion picture having a plurality of frames, each frame having a plurality of pixels, the method comprising:
selecting an initial frame and a final frame, at least one frame being between the initial and final frames;
selecting an initial pixel in the initial frame and a final pixel in the final frame, the initial pixel having an initial color, the final pixel having a final color;
determining an interpolated pixel for each frame between the initial and final frame based on the initial color and the final color; and
aligning the initial frame, final frame, and the at least one frame between the initial and final frames, the frames being aligned based upon the locations of the initial pixel, final pixel, and each interpolated pixel.

15. The method as defined by claim 14 wherein the interpolation is based upon the initial color, the final color, and the total number of frames between the initial and final frames.

16. The method as defined by claim 14 further comprising locating the interpolated pixel in a given frame between the initial and final frames.

17. The method as defined by claim 16 wherein each interpolated pixel has an interpolated color, further wherein the interpolated pixel in the given frame is located based upon the interpolated color of the interpolated pixel.

18. The method as defined by claim 17 wherein locating comprises determining if the interpolated color is within a given color tolerance.

19. The method as defined by claim 14 wherein the initial frame, final frame, and the at least one frame are aligned in memory.

20. The method as defined by claim 14 wherein aligning comprises setting the address of the initial pixel, final pixel and interpolated pixel to the same value.

21. The method according to claim 14 further comprising displaying at least the initial frame, final frame, and the at least one frame between the initial and final frames on a display.

22. A method for image stabilization of a digital sequence of images, wherein each image has a plurality of pixels and wherein each pixel has an associated address for display and is representative of a color, the method comprising:
selecting a pixel in the beginning image and a pixel in the ending image;
interpolating between the colors associated with the selected pixels from the beginning image and the ending image;
in the step of interpolating determining a color value for each image between the beginning image and the ending image;
locating within each image a pixel that is within the range of the determined color; and
readdressing each image so that the located pixels are aligned at the same display address.

23. A method for image stabilization of a sequence of temporally displayed digital video images, wherein each image contains a number of pixels and each pixel has an associated display position, the method comprising:
receiving a signal representative of a color of a pixel in a first image;
identifying a pixel in a second image having the same color within a predetermined range of colors wherein the range may include a single color; and
readdressing the second image so that the pixel in the second image resides at the same address as the pixel in the first image.

24. A method for image stabilization of a sequence of temporally displayed digital video images, wherein each image contains a number of pixels and each pixel has an associated display position, the method comprising:
interpolating between a color of a pixel in a first image and a color of a pixel in a third image to determine a searchable color;
identifying a pixel having a color in a second image within a range of the searchable color; and
repositioning the images such that the pixels from the first second and third images are aligned.

25. A system for image stabilization of a video sequence having a plurality of video frames, the system comprising:
a repositioning module for readdressing a second video image so that a pixel of the second video image having a color within a range of colors of a color of a pixel in the first image is readdressed to the address of the pixel in the first image.

26. The system according to claim 25, wherein all of the pixels in the second video image are readdressed.

27. The system according to claim 26, wherein the pixels are readdressed in relation to other pixels in the video frame.

28. A computer program product, on a tangible storage medium, for use with a computer system, the computer program product containing computer code for processing a motion picture having first and second frames, each frame having a plurality of pixels, the computer code comprising:
computer code for selecting a first pixel in the first frame having a given color;
computer code for locating a second pixel in the second frame having the given color; and
computer code for aligning the first frame and the second frame based upon the locations of the first and second pixels.

29. The computer program product according to claim 28 wherein the first and second frames are aligned in memory.

30. The computer program product as defined by claim 28 wherein the computer code for aligning comprises aligning the first frame and second frame about the first and second pixels.

31. The computer program product as defined by claim 28 further comprising computer code for determining the color of the first pixel, wherein the color is determined to be the given color.

32. The computer program product as defined by claim 28 wherein the computer code for locating includes computer code for determining if the color of the second pixel is within a given color tolerance.

33. The computer program product as defined by claim 28 wherein the first pixel has a first address, further wherein the computer code for aligning includes computer code for rearranging the second pixel to have an address that equals the first address.

34. The computer program product as defined by claim 28 further including computer code to linearly average the first frame and the second frame to provide a third frame.

35. The computer program product as defined by claim 34, wherein the third frame has a higher resolution than the first or second frame.

36. The computer program product as defined by claim 35, further comprising computer code for displaying the third frame on a display device.

37. The computer program product according to claim 28 further comprising:
computer code for selecting a region of the second frame for locating a second pixel having the given color within that region.

38. The computer program product according to claim 37, further comprising:
computer code for aligning the first frame and the second frame based upon a predetermined formula if a second pixel is not found within the second frame having the given color.

39. A computer program product according to claim 28, wherein the tangible storage medium is removable.

40. A computer program product, on a tangible storage medium, for use on a computer system, the computer program product having computer readable code thereon for processing a motion picture having a plurality of frames, each frame having a plurality of pixels, the computer code comprising:
computer code for selecting an initial frame and a final frame, at least one frame being between the initial and final frames;
computer code for selecting an initial pixel in the initial frame and a final pixel in the final frame, the initial pixel having an initial color, the final pixel having a final color;
computer code for determining an interpolated pixel for each frame between the initial and final frame based on the initial color and the final color; and
computer code for aligning the initial frame, final frame, and the at least one frame between the initial and final frames, the frames being aligned based upon the locations of the initial pixel, final pixel, and each interpolated pixel.

41. The computer program product as defined by claim 40 wherein the interpolation is based upon the initial color, the final color, and the total number of frames between the initial and final frames.

42. The computer program product as defined by claim 40 further comprising computer code for locating the interpolated pixel in a given frame between the initial and final frames.

43. The computer program product as defined by claim 42 wherein each interpolated pixel has an interpolated color, further wherein the interpolated pixel in the given frame is located based upon the interpolated color of the interpolated pixel.

44. The computer program product as defined by claim 43 wherein the computer code for locating includes computer code for determining if the interpolated color is within a given color tolerance.

45. The computer program product as defined by claim 40 including computer code for aligning the initial frame, final frame, and the at least one frame in memory.

46. The computer program product as defined by claim 40 wherein the computer code for aligning includes computer code for setting the address of the initial pixel, final pixel and interpolated pixel to the same value.

47. The computer program product according to claim 40 further comprising computer code for displaying at least the initial frame, final frame, and the at least one frame between the initial and final frames on a display.

48. A computer program product according to claim 40, wherein the tangible storage medium is removable.

49. A computer program product, on a tangible storage medium, for use with a computer system, the computer program product including computer readable code for image stabilization of a digital sequence of images, wherein each image has a plurality of pixels and wherein each pixel has an associated address for display and is representative of a color, the computer readable code comprising:
computer code for selecting a pixel in the beginning image and a pixel in the ending image;
computer code for interpolating between the colors associated with the selected pixels from the beginning image and the ending image;
the computer code for interpolating including computer code for determining a color value for each image between the beginning image and the ending image;
computer code for locating within each image a pixel that is within the range of the determined color; and
computer code for readdressing each image so that the located pixels are aligned at the same display address.

50. A computer program product according to claim 49, wherein the tangible storage medium is removable.

51. A computer program product, on a tangible storage medium for use with a computer system, the computer program product including computer readable code for image stabilization of a sequence of temporally displayed digital video images, wherein each image contains a number of pixels and each pixel has an associated display position, the computer readable code comprising:
computer code for receiving a signal representative of a color of a pixel in a first image;
computer code for identifying a pixel in a second image having the same color within a predetermined range of colors wherein the range may include a single color; and
computer code for readdressing the second image so that the pixel in the second image resides at the same address as the pixel in the first image.

52. A computer program product according to claim 51, wherein the tangible storage medium is removable.

53. A computer program product, on a tangible storage medium, for use with a computer system, the computer program product including computer readable code for image stabilization of a sequence of temporally displayed digital video images, wherein each image contains a number of pixels and each pixel has an associated display position, the computer readable code comprising:
computer code for interpolating between a color of a pixel in a first image and a color of a pixel in a third image to determine a searchable color;
computer code for identifying a pixel having a color in a second image within a range of the searchable color; and
computer code for repositioning the images such that the pixels from the first second and third images are aligned.

54. A computer program product according to claim 53, wherein the tangible storage medium is removable.

55. A computer program product, on a tangible storage medium for use with a computer system, the computer program product including computer readable code for image stabilization of a video sequence having a plurality of video frames, the computer readable code comprising:
computer code for readdressing a second video image so that a pixel of the second video image having a color within a range of colors of a color of a pixel in the first image is readdressed to the address of the pixel in the first image.

56. The computer program product according to claim 55, wherein in the computer code for readdressing, all of the pixels in the second video image are readdressed.

57. The computer program product according to claim 56, wherein in the computer code for readdressing, the pixels are readdressed in relation to other pixels in the video frame.

58. A computer program product according to claim 55, wherein the tangible storage medium is removable.

* * * * *

UNITED STATES PATENT AND TRADEMARK OFFICE
CERTIFICATE OF CORRECTION

| | | |
|---|---|---|
| PATENT NO. | : 7,436,437 B2 | Page 1 of 1 |
| APPLICATION NO. | : 10/669818 | |
| DATED | : October 14, 2008 | |
| INVENTOR(S) | : Susan Heath Calvin Fletcher et al. | |

It is certified that error appears in the above-identified patent and that said Letters Patent is hereby corrected as shown below:

In Col. 8, line 59
replace "composes"
with "comprises"

Signed and Sealed this

Sixteenth Day of December, 2008

JON W. DUDAS
*Director of the United States Patent and Trademark Office*